United States Patent
Park et al.

(10) Patent No.: US 10,524,275 B2
(45) Date of Patent: Dec. 31, 2019

(54) DATA TRANSMISSION METHOD BASED ON CHANNEL BONDING, AND APPARATUS THEREFOR

(71) Applicant: LG ELECTRONICS INC., Seoul (KR)

(72) Inventors: Sungjin Park, Seoul (KR); Kyungtae Jo, Seoul (KR); Jinmin Kim, Seoul (KR); Eunsung Park, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/572,302

(22) PCT Filed: May 4, 2016

(86) PCT No.: PCT/KR2016/004709
§ 371 (c)(1),
(2) Date: Nov. 7, 2017

(87) PCT Pub. No.: WO2016/182264
PCT Pub. Date: Nov. 17, 2016

(65) Prior Publication Data
US 2018/0152953 A1    May 31, 2018

Related U.S. Application Data

(60) Provisional application No. 62/158,540, filed on May 8, 2015.

(51) Int. Cl.
*H04W 88/08* (2009.01)
*H04W 72/12* (2009.01)
*H04W 84/12* (2009.01)
*H04W 72/04* (2009.01)
(Continued)

(52) U.S. Cl.
CPC ............ *H04W 72/12* (2013.01); *H04L 5/0037* (2013.01); *H04W 72/04* (2013.01); *H04W 72/0413* (2013.01); *H04W 84/12* (2013.01); *H04L 5/0007* (2013.01); *H04W 72/1268* (2013.01); *H04W 88/02* (2013.01); *H04W 88/08* (2013.01)

(58) Field of Classification Search
CPC .............................. H04W 72/12; H04W 88/08
USPC ......................................................... 370/338
See application file for complete search history.

(56) References Cited

U.S. PATENT DOCUMENTS 8,611,322 B2   12/2013  Kwon
2006/0280153 A1* 12/2006 Kwon ............... H04W 74/0808
                                                            370/338
2009/0274131 A1   11/2009 Lee et al.
(Continued)

*Primary Examiner* — Angel T Brockman
(74) *Attorney, Agent, or Firm* — Birch, Stewart, Kolasch & Birch, LLP

(57) ABSTRACT

The present specification relates to a method for transmitting, by a station (STA), data through channel bonding in a wireless LAN (WLAN) system, and an apparatus therefor. The station therefor receives scheduling information from an access point (AP), wherein the scheduling information includes information on a channel-bonding beacon interval and information on a non-channel-bonding beacon interval. If the station has channel-bonding capability and data to be transmitted through channel bonding, the station can transmit the data on the basis of the channel bonding through the channel-bonding beacon interval.

10 Claims, 9 Drawing Sheets

| B0    B3 | B4   B6 | B7 | B8 | B9 | B10 | B11 | B12  B15 |
|---|---|---|---|---|---|---|---|
| Allocation ID | Allocation Type | Pseudo-static | Truncatable | Extendable | PCP Active | LP SC Used | Bandwidth |
| Bits: 4 | 3 | 1 | 1 | 1 | 1 | 1 | 4 |

(51) Int. Cl.
   *H04L 5/00* (2006.01)
   *H04W 88/02* (2009.01)

(56) References Cited

U.S. PATENT DOCUMENTS

| | | |
|---|---|---|
| 2010/0304772 A1 | 12/2010 | Wang et al. |
| 2014/0078928 A1* | 3/2014 | Verma .................. H04W 84/20 370/254 |
| 2014/0153415 A1 | 6/2014 | Choudhury et al. |
| 2014/0177543 A1 | 6/2014 | Cordeiro |

* cited by examiner (a)

(b)

| Element ID | Length | Allocation 1 | Allocation 2 | ... | Allocation n |
|---|---|---|---|---|---|
| 1 | 1 | 15 | 15 | ... | 15 |

Octets:

FIG. 8

| Allocation Control | BF Control | Source AID | Destination AID | Allocation Start | Allocation Block Duration | Number of Blocks | Allocation Block Period |
|---|---|---|---|---|---|---|---|
| 2 | 2 | 1 | 1 | 4 | 2 | 1 | 2 |

Octets:

FIG. 9

| Allocation ID | Allocation Type | Pseudo-static | Truncatable | Extendable | PCP Active | LP SC Used | Bandwidth |
|---|---|---|---|---|---|---|---|
| B0  B3 | B4  B6 | B7 | B8 | B9 | B10 | B11 | B12  B15 |
| 4 | 3 | 1 | 1 | 1 | 1 | 1 | 4 |

Bits:

DATA TRANSMISSION METHOD BASED ON CHANNEL BONDING, AND APPARATUS THEREFOR

CROSS REFERENCE TO RELATED APPLICATIONS

This application is the National Phase of PCT International Application No. PCT/KR2016/004709, filed on May 4, 2016, which claims priority under 35 U.S.C. 119(e) to U.S. Provisional Application No. 62/158,540, filed on May 8, 2015, all of which are hereby expressly incorporated by reference into the present application.

TECHNICAL FIELD

The present invention relates to channel bonding in a mobile communication system, and more particularly, to a method performed by a station for transmitting data based on channel bonding in a wireless local area network (WLAN) system and apparatus therefor.

BACKGROUND ART

Standards for the WLAN technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.1 lax standards are under discussion.

Meanwhile, IEEE 802.11ad defines performance enhancement for high-speed throughput in the 60 GHz band, and IEEE 802.11ay, for introducing channel aggregation (or bonding) and MIMO technology to IEEE 802.11ad systems for the first time, is being discussed.

DISCLOSURE OF THE INVENTION

Technical Task

Although data transmission based on channel bonding can provide a high throughput rate, a delay may be caused in determining channels that can be bonded together.

In addition, an efficient channel bonding scheme capable of flexibly coping with media states is required for the above-mentioned IEEE 802.11ay standard.

In the following description, a method for efficiently performing channel bonding in a wireless communication system and transmitting data on the basis of the channel bonding and apparatus therefor will be explained.

Technical Solutions

To achieve these objects and other advantages and in accordance with the purpose of the invention, in an aspect of the present invention, provided herein is a method for transmitting data through channel bonding by a station (STA) in a wireless local area network (WLAN) system, including: receiving scheduling information from an access point (AP), wherein the scheduling information may include information on a channel bonding beacon interval and a non-channel bonding beacon interval; and if the STA has channel bonding capability and data to be transmitted through channel bonding, transmitting the data on the basis of the channel bonding in the channel bonding beacon interval.

Each of the channel bonding beacon interval and the non-channel bonding beacon interval may correspond to one beacon interval.

On the other hand, the channel bonding beacon interval and the non-channel bonding beacon interval may be allocated within one beacon interval.

Meanwhile, the scheduling information may be transmitted through an extended scheduling element in either a directional multi-gigabit (DMG) beacon or an announcement frame.

In this case, the extended scheduling element may include an allocation type field, and the allocation type field may indicate whether the scheduling information is to allocate a service period (SP), whether the scheduling information is to allocate a contention-based access period (CBAP), and whether the scheduling information is to allocate at least one of the channel bonding beacon interval and the non-channel bonding beacon interval.

Additionally, the extended scheduling element may include an allocation control field, and the allocation control field may include information on an allocated bandwidth.

The channel bonding beacon interval may include a service period (SP) and a contention-based access period (CBAP).

Meanwhile, in the CBAP, the STA may apply an independent backoff to a plurality of channels. In this case, if there are a busy channel and an idle channel among the plurality of channels, the STA may transmit the data through the idle channel. In addition, if there are two or more idle channels among the plurality of channels, the STA may transmit the data through channel bonding of the two or more idle channels.

Meanwhile, in the CBAP, the STA may apply a common backoff to a plurality of channels. In this case, if there is an idle channel among the plurality of channels, the STA may perform a backoff countdown. In addition, when a common backoff count becomes 0, if there are two or more idle channels and the STA has the channel bonding capability, the STA may transmit the data through channel bonding of the two or more idle channels.

In another aspect of the present invention, provided herein is a station (STA) device configured to transmit data through channel bonding in a wireless local area network (WLAN) system, including: a transceiver with at least one radio frequency (RF) chain, wherein the transceiver may be configured to receive scheduling information from an access point (AP); and a processor connected to the transceiver, wherein the processor may be configured to process the scheduling information received by the transceiver and obtain information on a channel bonding beacon interval and a non-channel bonding beacon interval from the scheduling information.

The STA device may further include a memory configured to store data, and if the STA device has channel bonding capability and the memory has data to be transmitted through channel bonding, the processor may be configured to transmit the data on the basis of the channel bonding in the channel bonding beacon interval.

Advantageous Effects

According to the present invention, it is possible to not only provide channel bonding with a high throughput rate but also minimizing a delay due to the channel bonding.

In addition, according to the present invention, it is possible to flexibly cope with media states for the above-mentioned IEEE 802.11 ay standard.

DESCRIPTION OF DRAWINGS

FIG. 6 is a diagram illustrating scheduling-based channel bonding according to another embodiment of the present invention;

FIGS. 7 to 9 are diagrams illustrating a configuration of scheduling information according to an embodiment of the present invention;

BEST MODE FOR INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As described above, the present invention relates to a method for transmitting data based on channel bonding in a mobile communication system and apparatus therefor. The present invention can be applied to various mobile communication systems, but the invention will be described by taking a WLAN system as one of the mobile communication systems.

Figure 1:
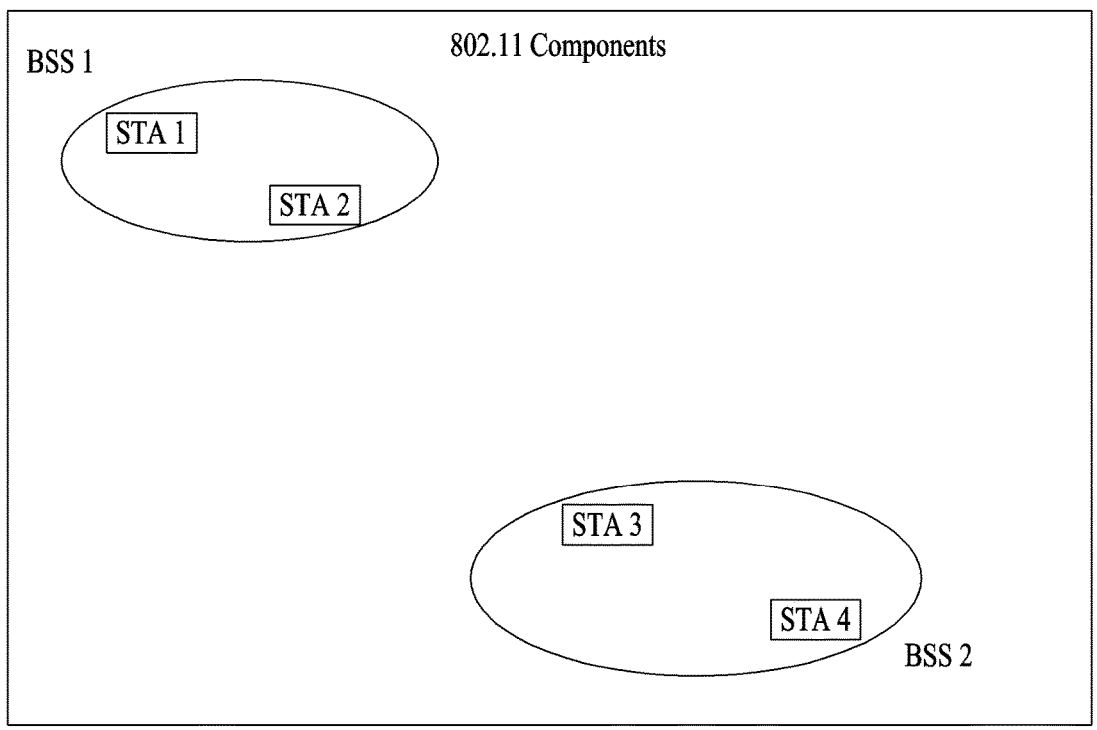
FIG. 1 is a diagram illustrating an exemplary configuration of a Wireless Local Area Network (WLAN) system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Medium Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
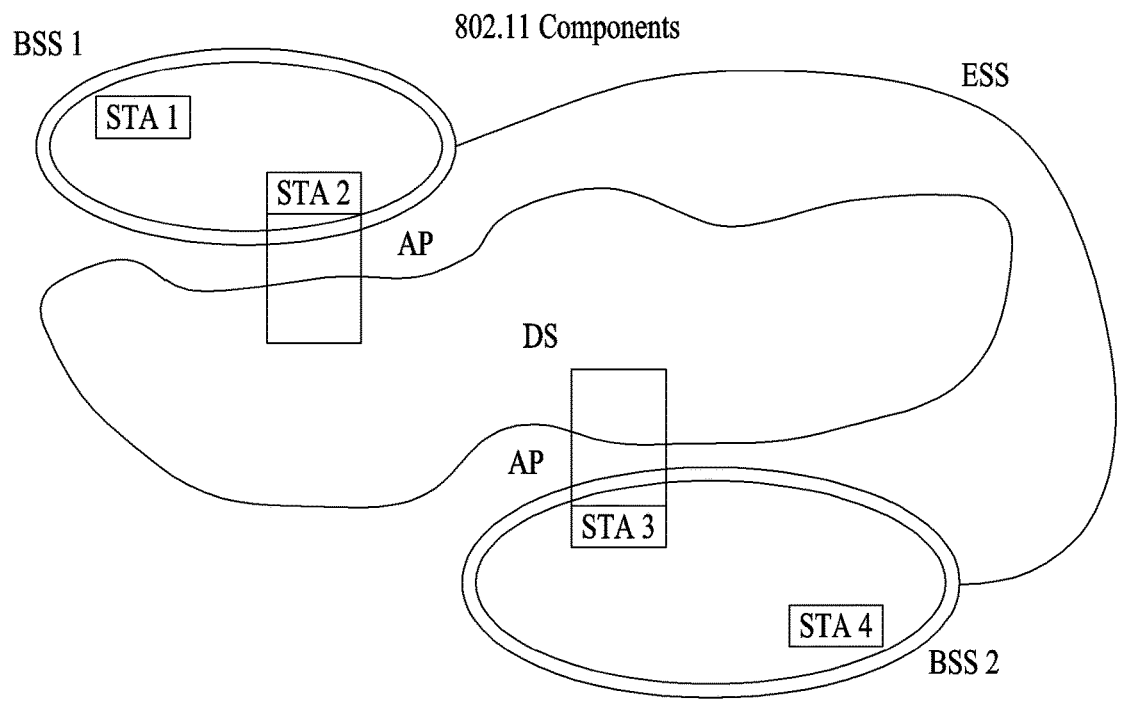
FIG. 2 is a diagram illustrating another exemplary configuration of a WLAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Based on the above, a method of channel aggregation or bonding in the WLAN system will be described.

Figure 3:
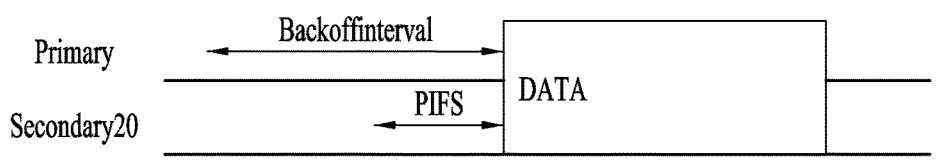
FIG. 3 is a diagram for explaining a basic method for performing channel bonding in a WLAN system.

FIG. 3 illustrates a basic method of performing channel aggregation or bonding in a WLAN system.

The example of FIG. 3 illustrates the operation of 40 MHz channel bonding performed by combining two 20 MHz channels in the IEEE 802.11n system. For IEEE 802.11ac, 40/80/160 MHz channel aggregation or bonding may be performed.

The two channels exemplarily shown in FIG. 3 include a primary channel and a secondary channel, and the STA may review the channel status of the primary channel of the two channels in the CSMA/CA manner. If the secondary channel is idle for a predetermined time (e.g., PIFS) while the primary channel is idle during a certain backoff interval and the backoff count becomes 0, the STA may transmit data by bonding the primary channel and the secondary channel.

Figure 4:
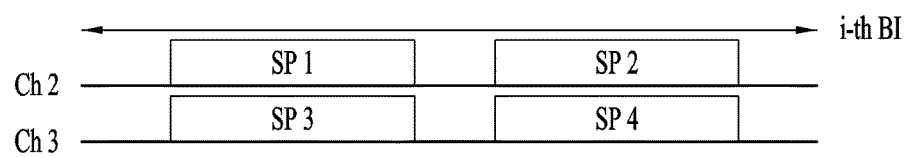
FIG. 4 illustrates a basic method of performing channel aggregation or bonding in a WLAN system.
Figure 4:
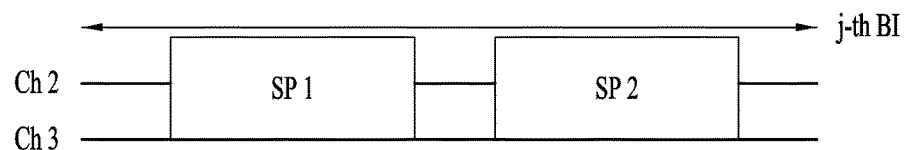

In the case where channel aggregation or bonding is performed based on contention as shown in FIG. 4, channel aggregation or bonding is allowed only when the secondary channel remains idle for a predetermined time at the time when the backoff count for the primary channel expires, and therefore the application of channel aggregation or bonding is very limited, and it is difficult to flexibly cope with the media situation.

Accordingly, in one aspect of the present invention, an AP may transmit scheduling information to STAs to perform access based on scheduling. Meanwhile, in another aspect of the present invention, channel access may be performed based on the above-described scheduling or on contention independently of the above-described scheduling. In yet another aspect of the present invention, communication may be performed based on beamforming using a spatial sharing technique.

FIG. 4 is a diagram illustrating scheduling-based channel bonding according to an embodiment of the present invention.

In an embodiment of the present invention, an AP can transmit scheduling information related to channel bonding to STAs. In this case, the scheduling information related to the channel bonding may include information on a channel bonding beacon interval and a non-channel bonding beacon interval. Specifically, referring to FIG. 4, an ith beacon interval may be allocated as the non-channel bonding beacon interval as shown in FIG. 4 (A), and a jth beacon interval may be allocated as the channel bonding beacon interval as shown in FIG. 4 (b).

The non-channel bonding beacon interval as shown in FIG. 4 (A) may be an interval for supporting either a legacy STA or an 11ay STA which desires to transmit data through a single channel. In addition, the channel bonding beacon interval shown in FIG. 4 (B) may be an interval for supporting an STA that desires to transmit data based on channel bonding among 11ay STAs.

The beacon interval illustrated in FIG. 4 can be configured with a combination of various periods including service periods.

Figure 5:
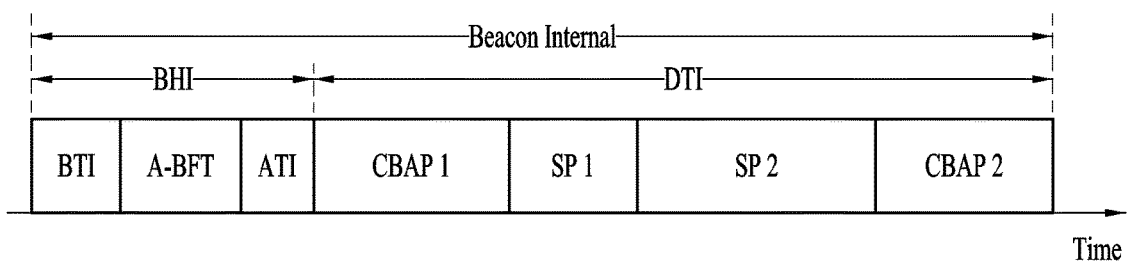
FIG. 5 is a diagram illustrating configuration of a beacon interval.

FIG. 5 is a diagram illustrating configuration of a beacon interval.

In 11ad-based DMG BSS systems, the media time may be divided into beacon intervals. The sub-intervals within a beacon interval may be referred to as access periods. Different access intervals within one beacon interval may have different access rules. The information on the access intervals may be transmitted to a non-AP STA or a non-PCP by the AP or Personal Basic Service Set Control Point (PCP).

As shown in FIG. 5, one beacon interval may include one beacon header interval (BHI) and one data transfer interval (DTI). The BHI may include a beacon transmission interval (BTI), an association beamforming training (A-BFT) interval, and an announcement transmission interval (ATI) as shown in FIG. 4.

The BTI refers to an interval during which one or more DMG beacon frames may be transmitted. The A-BFT interval refers to an interval during which beamforming training is performed by an STA that has transmitted the DMG beacon frame during the preceding BTI. The ATI refers to a request-response-based management access interval between a PCP/AP and a non-PCP/non-AP STA.

Meanwhile, the data transfer interval (DTI) is an interval during which frame exchange is performed between STAs, and may be allocated one or more Contention Based Access Periods (CBAPs) and one or more service periods (SPs) as shown in FIG. 5. Although FIG. 5 illustrates an example of allocation of two CBAPs and two SPs, this is illustrative and not restrictive.

In an embodiment of the present invention, it is proposed to operate based on scheduling information including information on a channel bonding beacon interval and a non-channel bonding beacon interval with reference to both FIGS. 4 and 5. In addition, not only SPs illustrated in FIG. 4 (B) but also a CBAP capable of channel bonding can be included in the channel bonding beacon interval.

Figures 6, 7:
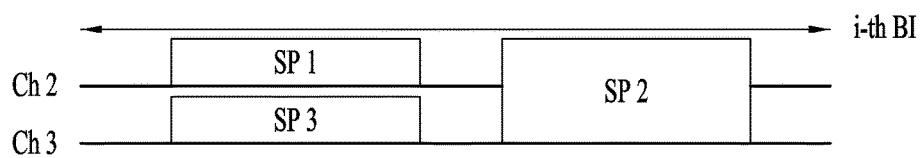

FIG. 6 is a diagram illustrating scheduling-based channel bonding according to another embodiment of the present invention.

Comparing the embodiment of FIG. 6 with that of FIG. 4, in the former embodiment, it is proposed that a channel bonding beacon interval and a non-channel bonding beacon boding is included in one beacon interval. Although FIG. 6 shows SP2 capable of channel bonding and SP1 and SP3 incapable of channel bonding as examples of the channel bonding beacon interval and the non-channel bonding beacon interval, various access periods can be configured as described with reference to FIG. 5.

When the channel bonding interval and the non-channel bonding interval are allocated together within one beacon interval (BI) as shown in FIG. 6, it is advantageous in that both legacy and 11ay STAs can transmit and receive data.

Hereinafter, a description will be given of a method for efficiently configuring the above-described scheduling information.

FIGS. 7 to 9 are diagrams illustrating a configuration of scheduling information according to an embodiment of the present invention.

In an embodiment of the present invention, it is proposed to transmit the aforementioned scheduling information through an extended scheduling element, which has the form illustrated in FIGS. 7 to 9. Such an extended scheduling element can be transmitted through a directional multi-gigabit (DMG) beacon or an announcement frame.

In the extended scheduling element illustrated in FIG. 7, an element ID field may indicate that the present information element is an extended scheduling element, and a length field may indicate a length of the present information element. Each of a plurality of allocation fields may have the form shown in FIG. 8.

In the allocation field shown in FIG. 8, an allocation control field may have the form illustrated in FIG. 9. When an allocation ID is set to a non-zero value, airtime from a source AID to a destination AID can be informed. Except CBAP allocation where the source and destination AIDS are set as a broadcast AID, allocation for a free flat configured with the source AID, destination AID, and allocation AID can be uniquely specified. In the CBAP allocation where the source and destination AIDs are set as the broadcast AID, the allocation ID may be set to 0.

As described above, the information on the channel bonding beacon interval and the non-channel bonding beacon interval can be provided through the scheduling information according to an embodiment of the present invention. To this end, in an embodiment of the present invention, it is proposed to inform whether specific scheduling information provides the information on the channel bonding beacon interval and the non-channel bonding beacon interval through an allocation type field of the extended scheduling element, which is illustrated in FIG. 9.

Various methods can be used for allocating the channel bonding beacon interval and the non-channel bonding beacon information as described above. Table 1 below shows an example of a case where the entirety of a beacon interval is divided into an interval capable of channel bonding and an interval incapable of channel bonding.

TABLE 1

| Bit 4 | Bit 5 | Bit 6 | Meaning |
|---|---|---|---|
| 0 | 0 | 0 | SP allocation |
| 1 | 0 | 0 | CBAP allocation |
| 0 | 1 | 0 | Channel bonding beacon interval allocation |
| 0 | 0 | 1 | Non-channel bonding beacon interval allocation |
| 0 | 1 | 1 | Channel bonding beacon interval allocation and non-channel bonding beacon interval allocation |

Meanwhile, an SP and CBAP for channel bonding can be allocated in one beacon interval, and Table 2 below shows a related example.

TABLE 2

| Bit 4 | Bit 5 | Bit 6 | Meaning |
|---|---|---|---|
| 0 | 0 | 0 | SP allocation (non-channel bonding) |
| 1 | 0 | 0 | CBAP allocation (non-channel bonding) |
| 0 | 1 | 0 | SP allocation (channel bonding) |
| 0 | 1 | 1 | CBAP allocation (non-channel bonding) |

As described above, the Non-channel bonding interval is an interval for allowing a legacy STA and an 11ay STA (particularly, an STA that uses a single channel regardless of the capability of performing channel bonding) to transmit and receive data. On the other hand, the channel bonding interval is an interval for supporting, among 11ay STAs, STAs that have the capability of performing channel bonding and intend to transmit and receive data on the basis of the channel bonding.

Source AID/destination AID fields in an allocation field and source AID/destination AID fields in a DMG allocation information field of a DMG TSPEC element can be used to indicate which STAs will be used.

Meanwhile, according to a combination of the allocation control field and the source AID/destination AID fields, in the non-channel bonding interval, one STA can use all channels or different STAs can use different channels.

Further, in an embodiment of the present invention, the last 4-bit field of the allocation control field can be used to provide bandwidth information used for the channel bonding as shown in FIG. 9.

As described above, allocation of the channel bonding beacon interval/non-channel bonding beacon interval according to an aspect of the present invention can be equally applied to not only the scheduling period but also the contention-based access period (CBAP). That is, an STA according to an embodiment of the present invention may use channel bonding in a channel-bonding CBAP within the channel bonding beacon interval in a contention-based manner. Therefore, the contention-based channel bonding scheme, which will be explained in the following description, can be combined with the aforementioned scheduling scheme. Alternatively, the contention-based channel bonding scheme can be independently performed in a contention-based manner without scheduling as in the related art.

Figure 10:
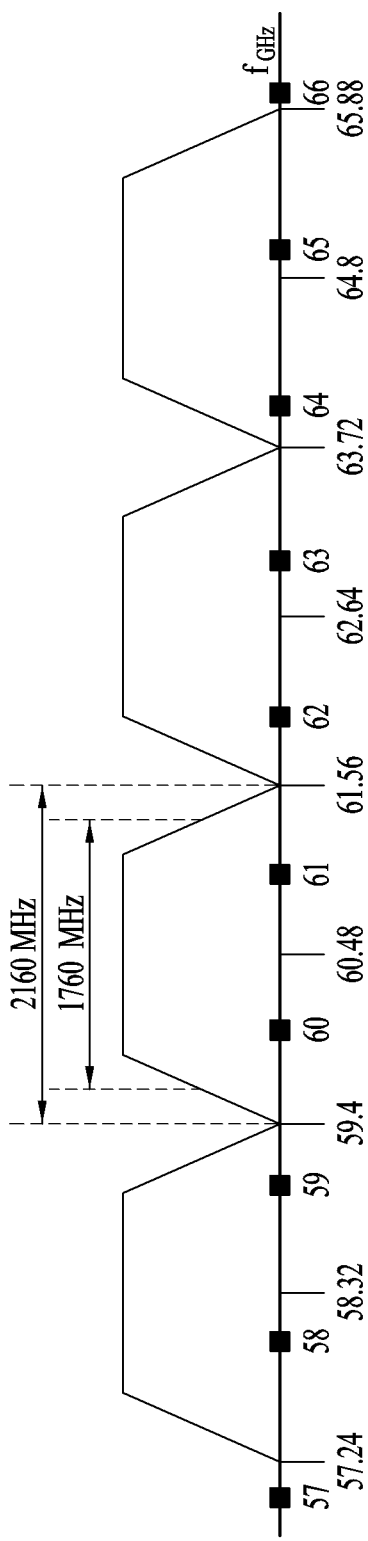
FIG. 10 is a diagram illustrating channels in the band of 60 GHz to explain a channel bonding operation according to an embodiment of the present invention.

FIG. 10 is a diagram illustrating channels in the band of 60 GHz to explain a channel bonding operation according to an embodiment of the present invention.

As shown in FIG. 10, four channels may be formed in the 60 GHz band, and in this case, a normal channel bandwidth may be 2.16 GHz. The up to four channels can be used for channel bonding in the 11ay system. The ISM band (57 GHz ~66 GHz) available at 60 GHz can be regulated differently depending on each country's situation. In general, among the channels illustrated in FIG. 10, channel 2 is available in all areas, and thus, it can be used as a default channel. In most of the areas except Australia, channel 2 and channel 3 can be used and these two channels can be utilized for channel bonding. However, channels utilized for channel bonding may vary, and the present invention is not limited to a specific channel.

Figure 11:
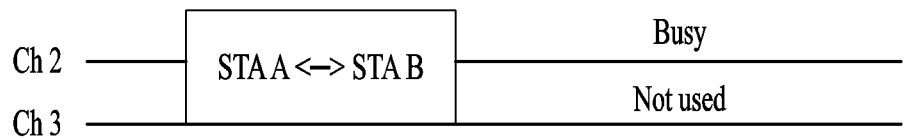
FIG. 11 is a diagram for explaining a basic contention-based channel bonding operation using the channel illustrated in FIG. 10.

FIG. 11 is a diagram for explaining a basic contention-based channel bonding operation using the channel illustrated in FIG. 10

In the example of FIG. 11, channel bonding is performed in consideration of the concept of primary/secondary channels. In addition, channel 2 is considered as a primary channel, and channel 3 is considered as a secondary channel. In the present example, STAs performs a backoff operation (and CCA) with respect to the primary channel and may monitor the secondary channel through CCA in parallel.

If the primary channel, channel 2 is busy, the secondary channel, channel 3 cannot be used even though channel 3 is an idle channel. The above channel access scheme may be used in extended RTS and DMG CTS frame transmission.

Figure 12:
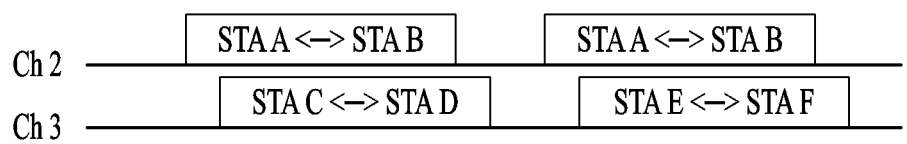
FIG. 12 is a diagram for explaining a contention-based channel bonding scheme according to an embodiment of the present invention.

FIG. 12 is a diagram for explaining a contention-based channel bonding scheme according to an embodiment of the present invention.

In this embodiment, it is proposed that an STA applies an independent backoff to a plurality of channels without distinguishing between primary and secondary channels. That is, in FIG. 12, the independent backoff (and CCA) can be performed on channel 2 and channel 3 without distinguishing between the primary/secondary channels.

In this case, if one channel is busy and the other channel is an idle channel, the STA can transmit data through the idle channel. Compared to the operation of FIG. 11, this operation has an advantage in that frequency efficiency can be improved.

In other words, according to the present embodiment, STAs can independently perform carrier sensing on each channel using at least one RF chain.

Meanwhile, it is assumed that there are STAs capable of using two channels. In addition, it is assumed that each of the STAs performs two backoffs independently and sensing of each corresponding channel. In this case, data can be transmitted through a channel with a backoff count of two backoff counts that becomes '0' first.

As a particular embodiment, when a backoff counter of a specific channel becomes 0, a backoff counter of another channel can be reset. When a backoff counter of the remaining channel of a corresponding STA is reset, a backoff may not be performed on the remaining channel until a channel used for data transmission becomes idle.

As another embodiment, even though a backoff counter of one channel becomes 0, if a backoff counter of the remaining channel of a corresponding STA is maintained as it is, data can be transmitted. That is, the STA can participate in contention again through a corresponding channel, and if the backoff counter becomes '0', the STA can transmit data. In this case, each of the two channels can be separately used for the data transmission. In addition, STAs capable of supporting channel bonding can transmit data through the channel bonding.

When all channels are simultaneously idle, STAs capable of channel bonding can transmit data through channel bonding.

The aforementioned method can support not only channel bonding through extended RTS/DMG CTS but also various channel access schemes. In other words, it is possible to support a specific channel access scheme by adding not only a channel bandwidth but also a channel access indicator to the conventional RTS/DMG CTS.

Figure 13:
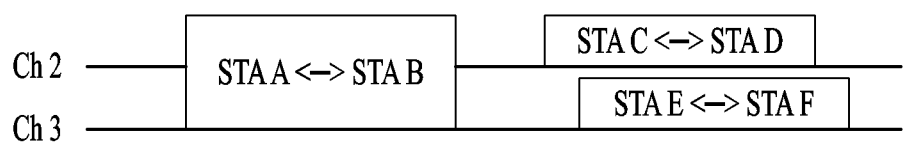
FIG. 13 is a diagram for explaining a contention-based channel bonding scheme according to another embodiment of the present invention.

FIG. 13 is a diagram for explaining a contention-based channel bonding scheme according to another embodiment of the present invention.

In this embodiment, it is proposed that an STA applies a common backoff to a plurality of channels. That is, it is proposed to perform a common backoff procedure (and CCA) where the same CW timer is allocated on channel 2 and channel 3 illustrated in FIG. 13. Herein, the meaning of 'common backoff' is as follows.

First, it is generally accepted that a common backoff counter is decreased when channel 2 and channel 3 are in the idle state, and data can be transmitted through channel bonding when the backoff counter becomes 0. However, in this embodiment, it is assumed that when a specific channel is busy and the remaining channel is idle, the common backoff is continuously performed through the idle channel. In other words, when channel 3 is idle even though channel 2 is busy, the common backoff counter is decreased. If the two channels are idle at the time when the common backoff counter becomes 0, channel bonding can be performed. However, when only one channel is idle, data can be transmitted through the corresponding channel.

Assume that there are STAs capable of using the two channels. When the common backoff counter becomes 0, if an STA capable of channel bonding desires to transmit data through channel bonding, the STA can perform channel bonding. In addition, in the same situation, if an STA capable of channel bonding desires to transmit data without performing channel bonding, the STA can transmit data using a single channel only.

Moreover, in the same situation, if an STA does not support channel bonding, the STA can transmit data using a single channel only.

Meanwhile, while an idle channel is used by a specific UE for data transmission, a busy channel can be used by another STA with the common backoff counter that becomes 0.

The aforementioned method can support not only channel bonding through extended RTS/DMG CTS but also various channel access schemes. In other words, it is possible to support a specific channel access scheme by adding not only a channel bandwidth but also a channel access indicator to the conventional RTS/DMG CTS.

Further, it is also possible to determine which one of the aforementioned methods will be used after informing a backoff type through RTS/CTS in the handshake step.

Meanwhile, methods for applying a spatial sharing (SPSH) scheme to the IEEE 802.11ay system through a combination with the aforementioned methods or independently.

Figure 14:
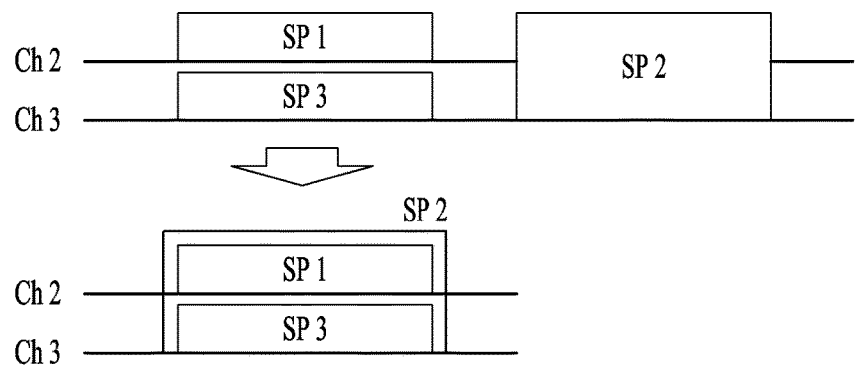
FIG. 14 is a diagram for explaining a method for performing spatial sharing according to an embodiment of the present invention.

FIG. 14 is a diagram for explaining a method for performing spatial sharing according to an embodiment of the present invention.

As described above, the 11ay system can support channel bonding through beamforming-based SPSH. That is, SP 2 where channel bonding is performed and SPs 1 and 3 may be allocated at different times as shown in the top of FIG. 14, but SP 2 and SPs 1 and 3 may be allocated at the same time through SPSH.

In an embodiment of the present invention, SPSH can be supported using indicators of SPSH and interference control fields in a DMG capability element. In addition, it is preferred that a PCP/AP uses channel quality information with directivity to check presence of SPSH-based channel bonding.

Further, SPSH-based channel bonding can be applied to a CBAP in the same manner as described above.

Figure 15:
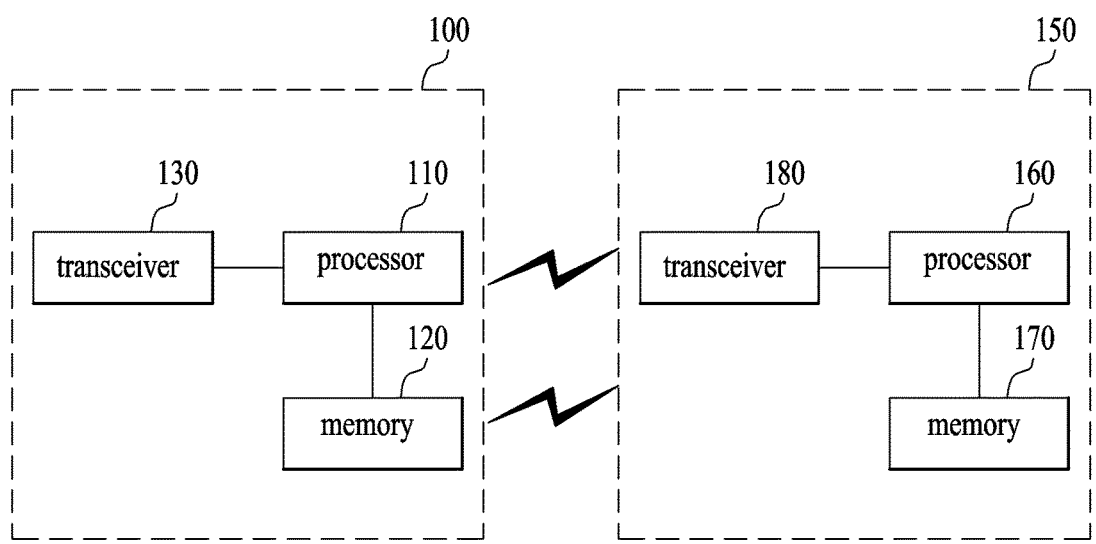
FIG. 15 is a diagram illustrating devices for implementing the above-described methods.

FIG. 15 is a diagram illustrating devices for implementing the above-described methods.

In FIG. 15, a wireless device 800 may correspond to the above-described specific STA, and a wireless device 850 may correspond to the above-described PCP/AP.

The STA 800 may include a processor 810, a memory 820, and a transceiver unit 830, and the PCP/AP 850 may include a processor 860, a memory 870, and a transceiver unit 880. The transceiver unit 830/880 may transmit/receive radio signals and be driven by a physical layer defined in IEEE 802.11/3GPP. The processor 810/860 may be driven by a physical layer and/or a MAC layer and connected to the transceiver unit 830/880. The processor 810/860 can perform the aforementioned UL MU scheduling procedure.

The processor 810/860 and/or the transceiver unit 830/880 may include an application-specific integrated circuit (ASIC), a different chipset, a logic circuit, and/or a data processor. The memory 820/870 may include a read-only memory (ROM), a random access memory (RAM), a flash memory, a memory card, a storage medium, and/or other storage units. When an embodiment is executed by software, the above-described methods may be implemented as modules (e.g., processes, functions, etc.) for performing the aforementioned functions. The modules can be stored in the memory 820/870 and driven by the processor 810/860. In addition, the memory 820/870 can be provided within or outside the processor 810/860 and connected to the processor 810/860 by well-known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

Although the present invention is described on the assumption that the invention is applied to the WLAN system based on IEEE 802.11, it is not limited thereto. The present invention can be applied to various wireless systems capable of data transmission based on channel bonding in the same manner.

What is claimed is:

1. A method for transmitting data by a station (STA) in a wireless local area network (WLAN) system supporting a primary channel and a secondary channel, the method comprising:

receiving, from an access point (AP), an extended scheduling element for allocating one channel that is one of up to four channels used for a channel bonding in the WLAN system and not being the primary channel of the WLAN system; and transmitting the data through the one channel that is the one of the up to four channels used for the channel bonding in the WLAN system and not being the primary channel, based on the extended scheduling element.

2. The method of claim 1, wherein the extended scheduling element comprises a plurality of allocation information included in one beacon interval.

3. The method of claim 1, wherein the extended scheduling element is transmitted via a beacon frame or an announcement frame.

4. The method of claim 1, wherein the allocation of the one channel not being the primary channel corresponds to a service period (SP).

5. A method for receiving data by a station (STA) in a wireless local area network (WLAN) system supporting a primary channel and a secondary channel, the method comprising:

receiving, from an access point (AP), an extended scheduling element for allocating one channel that is one of up to four channels used for a channel bonding in the WLAN system and not being the primary channel of the WLAN system; and receiving the data through the one channel that is the one of the up to four channels used for the channel bonding in the WLAN system and not being the primary channel, based on the extended scheduling element.

6. The method of claim 5, wherein the extended scheduling element comprises a plurality of allocation information included in one beacon interval.

7. The method of claim 5, wherein the extended scheduling element is transmitted via a beacon frame or an announcement frame.

8. The method of claim 5, wherein the allocation of the one channel not being the primary channel corresponds to a service period (SP).

9. A station (STA) device configured to transmit data in a wireless local area network (WLAN) system supporting a primary channel and a secondary channel, the STA device comprising:

a transceiver with at least one radio frequency (RF) chain, wherein the transceiver receives scheduling information from an access point (AP); and a processor connected to the transceiver, wherein the processor is configured to:

receive an extended scheduling element for allocating one channel that is one of up to four channels used for a channel bonding in the WLAN system and not being the primary channel of the WLAN system, and transmit the data through the one channel that is the one of the up to four channels used for the channel bonding in the WLAN system and not being the primary channel, based on the extended scheduling element.

10. A station (STA) device configured to receive data in a wireless local area network (WLAN) system supporting a primary channel and a secondary channel, the STA device comprising:

a transceiver with at least one radio frequency (RF) chain, wherein the transceiver receives scheduling information from an access point (AP); and a processor connected to the transceiver, wherein the processor is configured to:

receive an extended scheduling element for allocating one channel that is one of up to four channels used for a channel bonding in the WLAN system and not being the primary channel of the WLAN system, and receive the data through the one channel that is the one of the up to four channels used for the channel bonding in the WLAN system and not being the primary channel, based on the extended scheduling element.

* * * * *